(12) United States Patent
Shan et al.

(10) Patent No.: US 11,750,963 B2
(45) Date of Patent: Sep. 5, 2023

(54) COMMUNICATION CONTROL METHOD, DEVICE AND SYSTEM, CHARGING BOX AND WIRELESS EARPIECE

(71) Applicant: HUAWEI TECHNOLOGIES CO., LTD., Shenzhen (CN)

(72) Inventors: Yichao Shan, Shandong (CN); Lei Lin, Shandong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 235 days.

(21) Appl. No.: 17/299,492

(22) PCT Filed: Sep. 25, 2019

(86) PCT No.: PCT/CN2019/107900
§ 371 (c)(1),
(2) Date: Jun. 3, 2021

(87) PCT Pub. No.: WO2020/134246
PCT Pub. Date: Jul. 2, 2020

(65) Prior Publication Data
US 2022/0086553 A1    Mar. 17, 2022

(30) Foreign Application Priority Data
Dec. 24, 2018   (CN) .......................... 201811583718.2

(51) Int. Cl.
H04R 1/10       (2006.01)
H02J 50/80      (2016.01)
H02J 50/00      (2016.01)

(52) U.S. Cl.
CPC ............ *H04R 1/1025* (2013.01); *H02J 50/80* (2016.02); *H04R 1/1041* (2013.01); *H02J 50/005* (2020.01); *H04R 2420/07* (2013.01)

(58) Field of Classification Search
CPC ...... H04R 1/1025; H04R 1/1041; H02J 50/80
See application file for complete search history.

(56) References Cited

U.S. PATENT DOCUMENTS

2013/0119922 A1*  5/2013  Chen .................... H02J 7/0036
                                              320/137
2014/0225558 A1    8/2014  Park
(Continued)

FOREIGN PATENT DOCUMENTS

CN      105657631 A     6/2016
CN      107818066 A     3/2018
(Continued)

OTHER PUBLICATIONS

International Search Report from PCT/CN2019/107900 filed Sep. 25, 2019, dated Dec. 25, 2019.

*Primary Examiner* — Simon King
(74) *Attorney, Agent, or Firm* — Leydig, Voit & Mayer, Ltd.

(57) ABSTRACT

Disclosed by the present invention are a communication control method, device and system, a charging box and a wireless earpiece, the method comprising: when charging a first wireless earpiece by means of two power pins, the charging box obtains first data to be sent if communication with the first wireless earpiece is needed; and according to the first data to be sent, the charging box controls the output voltages of the two power pins to be correspondingly exchanged, so that the first wireless earpiece switches according to the output voltage of a corresponding power pin so as to obtain the first data to be sent during the charging process. In the present method, the charging box controls the output voltages of the two power pins to be correspondingly exchanged according to the first data to be sent, so that the wireless earpiece may obtain the first data to be sent according to the switching of the charging voltages when using the (Continued)

switchable charging voltages of the two power pins to perform charging. Therefore, the wireless earpiece uses the two pins used for charging to communicate with the charging box during the charging process, thereby reducing the setup cost and taking both a small size and aesthetic appearance into account.

6 Claims, 7 Drawing Sheets

(56) References Cited

U.S. PATENT DOCUMENTS

| | | | |
|---|---|---|---|
| 2016/0157036 | A1 | 6/2016 | Wiesbauer et al. |
| 2018/0255389 | A1* | 9/2018 | Hankey ................. H04R 1/1016 |
| 2020/0314398 | A1* | 10/2020 | Zhang ................. H04N 9/3141 |

FOREIGN PATENT DOCUMENTS

| | | | |
|---|---|---|---|
| CN | 107948799 | A | 4/2018 |
| CN | 108233957 | A | 6/2018 |
| CN | 108882082 | A | 11/2018 |
| CN | 109640207 | A | 4/2019 |
| TW | 201319603 | A | 5/2013 |

\* cited by examiner

COMMUNICATION CONTROL METHOD, DEVICE AND SYSTEM, CHARGING BOX AND WIRELESS EARPIECE

The present application is the U.S. national phase of International Application No. PCT/CN2019/107900, titled "COMMUNICATION CONTROL METHOD, DEVICE AND SYSTEM, CHARGING BOX AND WIRELESS EARPIECE", filed on Sep. 25, 2019, which claims the priority to Chinese Patent Application No. 201811583718.2, titled "COMMUNICATION CONTROL METHOD, DEVICE AND SYSTEM, CHARGING CASE AND WIRELESS EARPIECE", filed on Dec. 24, 2018, with the China National Intellectual Property Administration, both of which are incorporated herein by reference in their entirety.

FIELD

The present disclosure relates to the technical field of portable listening devices, and in particular to a method, apparatus, and system for communication control, a charging case, and a wireless earpiece.

BACKGROUND

Current earpieces can be classified into wired earpieces and wireless earpieces. The wired earpieces require left and right earpieces to form left and right sound channels through a wired connection to produce a stereo effect, but are very inconvenient to wear. The wireless earpieces communicate with the terminal through a wireless communication protocol (such as Bluetooth). Compared with the wired earpieces, they feature no need of organizing cables and convenient use. The latest true wireless interconnected stereo Bluetooth earpieces (TWS earpieces) are typical wireless earpieces. The TWS earpieces often require a matching charging case to charge wireless earpieces, and need to communicate with the charging case, to perform operations such as making the wireless earpieces enter a pairing state and restoring the wireless earpieces to factory settings.

Figure 1:
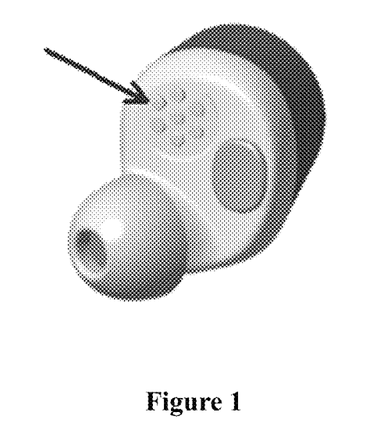
FIG. 1 is a diagram of a 5-pin configuration in a wireless earpiece in related art.

In related art, in order for a wireless earpiece to communicate with the charging case during charging, in addition to the two pins (such as 5V and GND) for charging, 3 more pins (such as detection, TX and RX) for communication are further provided, e.g., the 5 pins in FIG. 1, which occupies a relatively large area and hence results in a cumbersome appearance, running counter to the miniaturization and aesthetic appearance of the TWS earpieces. There is also a solution of applying power line communication to the two pins for charging, that is, while charging the wireless earpiece, the charging case can communicate with the wireless earpiece on a charging voltage signal modulated by a communication signal. However, such method for communication requires a dedicated chip, which results in a high cost.

Therefore, how to enable the wireless earpiece to use the two pins for charging to communicate with the charging case during charging, to reduce the area occupied by the pins with considerations into both the miniaturization and aesthetic appearance, and to avoid applying the power line communication method to reduce the configuration cost, is an urgent problem to be solved.

SUMMARY

An object of the present disclosure is to provide a method, apparatus and system for communication control, a charging case, and a wireless earpiece, to enable the wireless earpiece to communicate with the charging case through the two pins for charging during charging without application of the power line communication method, to lower the configuration cost and reduce the area occupied by the pins with considerations into both the miniaturization and aesthetic appearance.

To solve the above technical problems, a communication control method is provided according to the present disclosure. The method includes:

obtaining first to-be-sent data, in a case that communication with a first wireless earpiece is needed when a charging case is charging the first wireless earpiece through two power supply pins, and controlling output voltages of the two power supply pins to interchange with each other according to the first to-be-sent data, for the first wireless earpiece to obtain the first to-be-sent data during charging according to switching of the output voltage of a corresponding one of the power supply pins.

In an optional embodiment, controlling the output voltages of the two power supply pins to interchange with each other according to the first to-be-sent data includes:

controlling a switch circuit to interchange power supply wirings for the power supply pins according to the first to-be-sent data, where the power supply wirings for the power supply pins include wirings corresponding to two output terminals of a charging output device in the charging case.

In an optional embodiment, the method further includes:

controlling, in a case that communication with a second wireless earpiece is needed when the charging case is charging the second wireless earpiece through two other power supply pins, the switch circuit to interchange power supply wirings for the two other power supply pins corresponding to the second wireless earpiece according to obtained second to-be-sent data, where the power supply wirings for the two other power supply pins corresponding to the second wireless earpiece include wirings corresponding to the two output terminals of the charging output device.

A communication control apparatus is further provided according to the present disclosure, which comprises:

an obtaining module, configured to obtain first to-be-sent data, in a case that communication with a first wireless earpiece is needed when a charging case is charging the first wireless earpiece through two power supply pins, and a sending module, configured to control output voltages of the two power supply pins to interchange with each other according to the first to-be-sent data, for the first wireless earpiece to obtain the first to-be-sent data during charging according to switching of the output voltage of a corresponding one of the power supply pins.

A charging case is further provided according to the present disclosure, which comprises a charging output device, a switch circuit, a processor, a first power supply pin, and a second power supply pin, where a first output terminal and a second output terminal of the charging output device are respectively connected to the first power supply pin and the second power supply pin through the switch circuit, and are configured to supply power to a first wireless earpiece connected to the first power supply pin and the second power supply pin, and the switch circuit is connected to the processor and is configured to, under the control of the processor, turn on a connection between the first output terminal and the first power supply pin and a connection between the second output terminal and the second power supply pin, or turn on a connection between the first output terminal and the second power supply pin and a connection between the second output terminal and the first power supply pin.

In an optional embodiment, the charging case further comprises a third power supply pin, and a fourth power supply pin, where the first output terminal and the second output terminal of the charging output device are respectively connected to the third power supply pin and the fourth power supply pin through the switch circuit, and are configured to supply power to a second wireless earpiece connected to the third power supply pin and the fourth power supply pin, and the switch circuit is further configured to, under the control of the processor, turn on a connection between the first output terminal and the third power supply pin and a connection between the second output terminal and the fourth power supply pin, or turn on a connection between the first output terminal and the fourth power supply pin and a connection between the second output terminal and the third power supply pin.

A communication control method is further provided according to the present disclosure, which comprises:

detecting voltage switching information of a charging pin during charging of a wireless earpiece, and obtaining corresponding data according to the voltage switching information.

A communication control apparatus is further provided according to the present disclosure, which comprises:

a detecting module, configured to detect voltage switching information of a charging pin during charging of a wireless earpiece, and a receiving module, configured to obtain corresponding data according to the voltage switching information.

A wireless earpiece is further provided according to the present disclosure, which comprises a charging device, a voltage converter, a communication device, and two charging pins, where two input terminals of the voltage converter are respectively connected to the two charging pins in a one-to-one manner, two output terminals of the voltage converter are connected to two power input terminals of the charging device, and are configured to convert interchangeable charging voltages of the two charging pins into fixed output voltages for supplying power to the charging device, and the communication device is configured to detect voltage switching information of a corresponding one of the charging pins, and obtain corresponding data according to the voltage switching information.

In addition, a communication control system is further provided according to the present disclosure, which comprises:

any of the charging cases as described above and any of the wireless earpieces as described above.

The communication control method according to the present disclosure includes: obtaining first to-be-sent data, in a case that communication with a first wireless earpiece is needed when a charging case is charging the first wireless earpiece through two power supply pins, and controlling output voltages of the two power supply pins to interchange with each other according to the first to-be-sent data, so that the first wireless earpiece obtains the first to-be-sent data during charging according to switching of the output voltage of a corresponding one of the power supply pins.

As seen from the above, the charging case controls the output voltages of the two power supply pins to interchange with each other according to the first to-be-sent data, so as to interchange charging voltages of two charging pins in the first wireless earpiece, so that the wireless earpiece can obtain the first to-be-sent data according to the switching of the charging voltage when charged by the interchangeable charging voltages of the two charging pins. Communication between the wireless earpiece and the charging case during charging is achieved with the two pins for charging without application of the power line communication method, which lowers the configuration cost and reduces the area occupied by the pins with considerations into both the miniaturization and aesthetic appearance. Besides, a communication control apparatus and system, a charging case and a wireless earpiece are further provided according to the present disclosure, which also have the above beneficial effects.

BRIEF DESCRIPTION OF THE DRAWINGS

For clearer illustration of the technical solutions according to embodiments of the present disclosure or conventional techniques, hereinafter briefly described are the drawings to be applied in embodiments of the present disclosure or conventional techniques. Apparently, the drawings in the following descriptions are only some embodiments of the present disclosure, and other drawings may be obtained by those skilled in the art based on the provided drawings without creative efforts.

DETAILED DESCRIPTION OF EMBODIMENTS

In order to make the objectives, technical solutions, and advantages of the embodiments of the present disclosure clearer, hereinafter technical solutions in embodiments of the present disclosure are described clearly and completely in conjunction with the drawings in embodiments of the present disclosure. Apparently, the described embodiments are only some rather than all of the embodiments of the present disclosure. Any other embodiments obtained based on the embodiments of the present disclosure by those skilled in the art without any creative effort fall within the scope of protection of the present disclosure.

Figure 4:
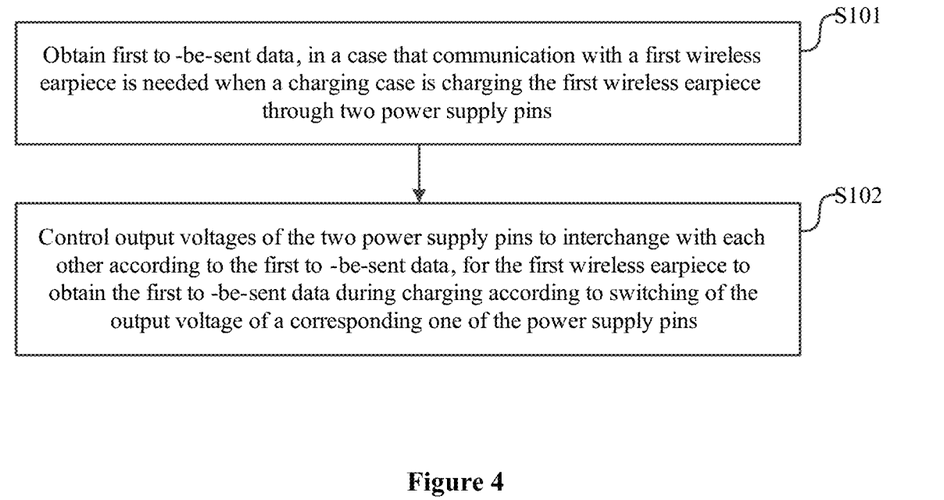
FIG. 4 is a flow chart of a communication control method according to an embodiment of the present disclosure.

Reference is made to FIG. 4, which is a flow chart of a communication control method according to an embodiment of the present disclosure. The method may include step 101 and step 102.

In step 101, first to-be-sent data is obtained, in a case that communication with a first wireless earpiece is needed when a charging case is charging the first wireless earpiece through two power supply pins.

Figure 2:
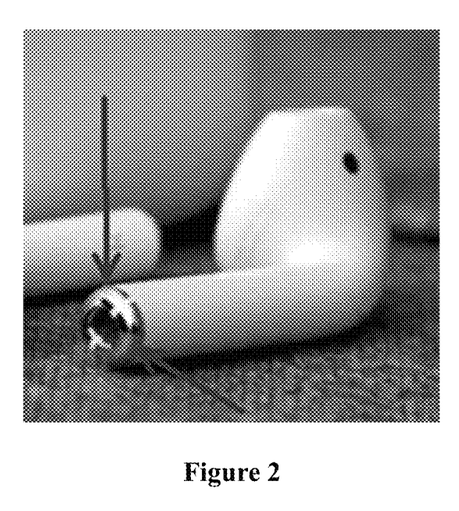
FIG. 2 is a diagram of a 2-pin configuration in a wireless earpiece in related art.
Figure 3:
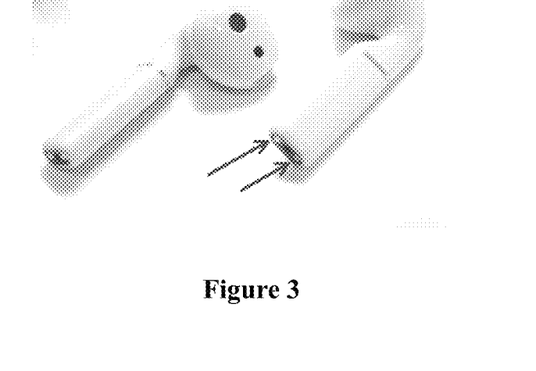
FIG. 3 is a diagram of another 2-pin configuration in a wireless earpiece in related art.

It should be noted that the two power supply pins in this step may be two contacts provided in the charging case for connecting to two charging pins of the wireless earpiece to supply power to the wireless earpiece, such as two contacts provided in the charging case corresponding to the two circular metal contacts (charging pins) of the wireless earpiece in FIG. 2, or two contacts provided in the charging case corresponding to the two contacts (charging pins) of the wireless earpiece in FIG. 3.

The first wireless earpiece in this step may be a wireless earpiece (such as a TWS earpiece), which has two charging pins connected to the two power supply pins of the charging case. The to-be-sent first data in this step may be data that is obtained by a processor in the charging case and needs to be sent to the first wireless earpiece when the charging case is charging the first wireless earpiece through the two power supply pins. The specific content of the first to-be-sent data can be configured by a designer, which, for example, may be data corresponding to an instruction for controlling the first wireless earpiece to enter a pairing state and restore factory settings, where the instruction is generated by the user operating a human-computer interaction device, for example, a button, on the charging case, which is not limited in the embodiment in any form.

It is understandable that a specific manner for the processor to obtain the first to-be-sent data can be configured by a designer according to practical scenarios and user needs. For example, it can be first determined whether the charging case needs to communicate with the first wireless earpiece and whether the charging case is charging the first wireless earpiece. If both the determinations are positive, then the first to-be-sent data, which needs to be sent to the first wireless earpiece in step 102, is obtained. Alternatively, the first to-be-sent data to be sent to the first wireless earpiece may be obtained first, and then it is determined whether the charging case is charging the first wireless earpiece. If the determination is positive, step 102 is performed. The embodiment is not limited to the above in any form.

In step 102, output voltages of the two power supply pins are controlled to interchange with each other according to the first to-be-sent data, for the first wireless earpiece to obtain the first to-be-sent data during charging according to switching of the output voltage of a corresponding one of the power supply pins.

Figure 5:
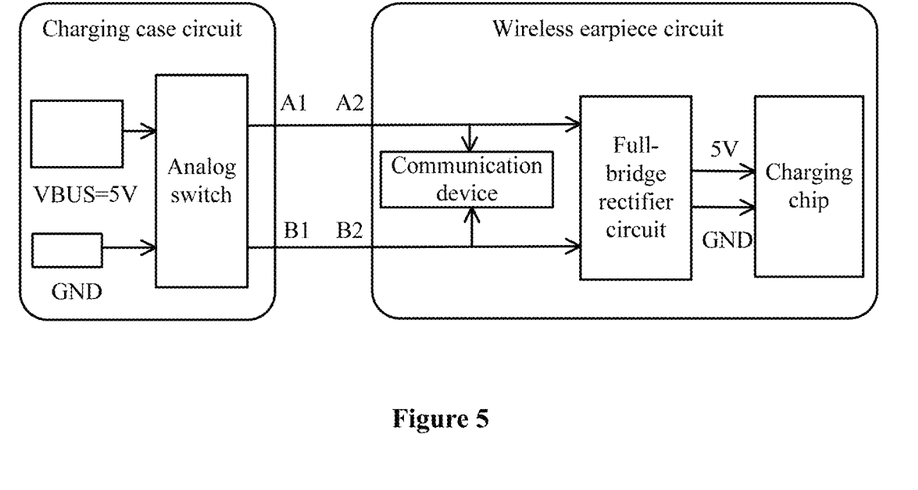
FIG. 5 is a schematic diagram of a connection between a charging case circuit and a wireless earpiece circuit according to an embodiment of the present disclosure.

It is understandable that an object of this step may be to send the first to-be-sent data to the first wireless earpiece during the process of charging the first wireless earpiece, by the processor in the charging case controlling the output voltages of the two power supply pins to interchange with each other according to the first to-be-sent data. As shown in FIG. 5, the processor can interchange the output voltages (5V and GND) of the two power supply pins (A1 and B1) according to the first to-be-sent data. For example, the first to-be-sent data is 1010. A communication device in the first wireless earpiece detects a switching of the output voltage of A1, that is, detecting A2 of two charging pins (A2 and B2) of the first wireless earpiece, and the processor may first control A1 to output 5V (VBUS, a USB voltage) and B1 to output GND, and then control A1 and B1 to interchange with each other (i.e., A1 outputs GND, and B1 outputs 5V), so that the communication device receives 1 (5V) 0 (GND). The above process is repeated once, so that the communication device receives 1010 after the above process is performed twice.

It should be noted that the interchange of the output voltages of the two power supply pins in this step may be the interchange of the output voltages between the two power supply pins. For example, A1 outputs 5V and A2 outputs GND at a current instant, and A1 outputs GND and A2 outputs 5V at a next instant if the interchange is performed at the next instant.

Specifically, a specific manner for the processor to control the output voltages of the two power supply pins to interchange can be configured by a designer according to the practical scenario and user needs, which may be configured according to a specific circuit structure in the charging case. For example, two output terminals (e.g., 5V and GND in FIG. 5) of a charging output device of the charging case are respectively connected to the two power supply pins (e.g., A1 and B1 in FIG. 5) through a switch circuit (e.g., the analog switch in FIG. 5). In this case, the processor can control the switch circuit to switch between power supply wirings for each power supply pin according to the first to-be-sent data. As shown in FIG. 5, A1 is switched between the 5V output terminal and the GND output terminal, and B1 is switched between the 5V output terminal and the GND output terminal, so that 5V and GND output by A1 and B1 are interchanged, which is not limited in this embodiment in any form as long as it is ensured that the processor can control the output voltages of the two power supply pins to interchange with each other according to the first to-be-sent data.

Correspondingly, a specific manner for the processor to control the output voltages of the two power supply pins to interchange with each other according to the first to-be-sent data can be configured by a designer. For example, a rate of interchanging of the output voltages of the two power supply pins may be controlled according to a communication requirement, so as to satisfy the requirement of communications at any rate, which is not limited in the embodiment in any form.

It should be noted that, the embodiment is described taking for example the communication during the charging case charging one wireless earpiece (the first wireless earpiece). As for communication during the charging case charging another wireless earpiece (a second wireless earpiece), i.e., communication during the charging case charging two wireless earpieces, it can be implemented in a manner same as or similar to the method in the embodiment, which is not limited in the embodiment in any form.

In the embodiment, the charging case controls, according to the first to-be-sent data, the output voltages of the two power supply pins to interchange with each other, so as to interchange charging voltages of two charging pins in the first wireless earpiece, so that the wireless earpiece can obtain the first to-be-sent data according to the switching of the charging voltage when charged with the interchangeable charging voltages of the two charging pins. Communication between the wireless earpiece and the charging case during charging is achieved with the two pins for charging without application of the power line communication method, which lowers the configuration cost and reduces the area occupied by the pins with considerations into both the miniaturization and aesthetic appearance.

Figure 6:
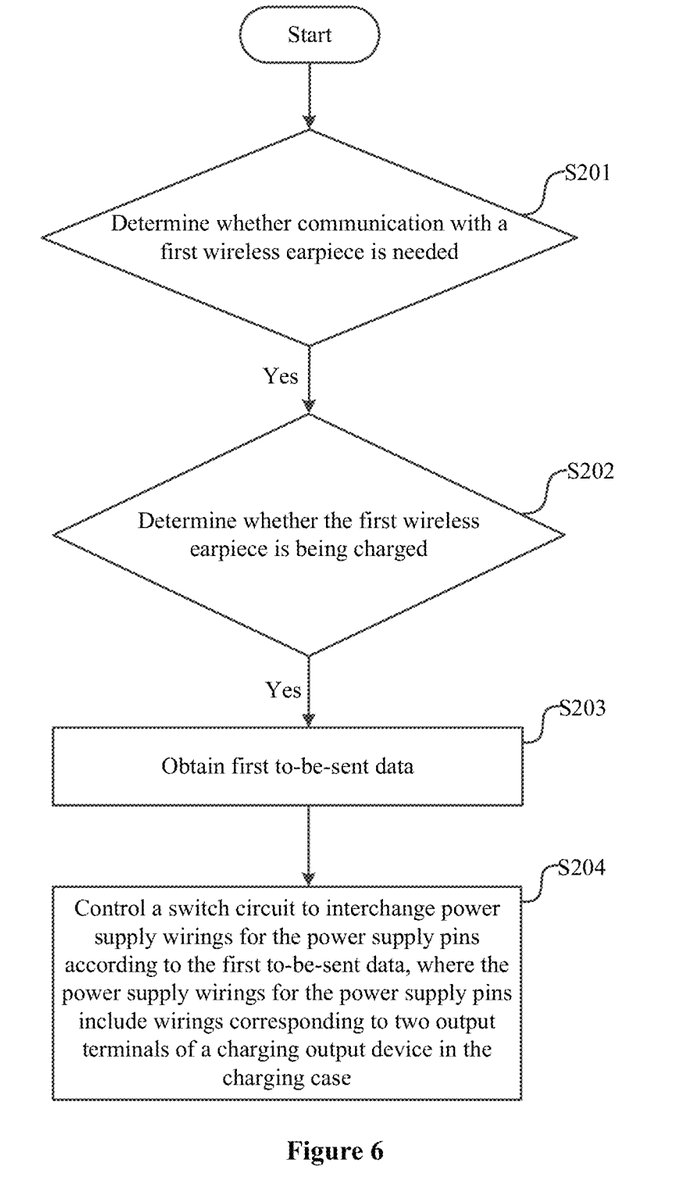
FIG. 6 is a flow chart of another communication control method according to an embodiment of the present disclosure.

Reference is made to FIG. 6, which is a flow chart of another communication control method according to an embodiment of the present disclosure. The method includes step 201 to step 204.

In step 201, it is determined whether communication with a first wireless earpiece is needed; if so, step 202 is performed.

The specific method for a processor in a charging case to determine whether communication with the first wireless earpiece is needed can be configured by the designer. For example, it can be determined whether the charging case needs to communicate with the first wireless earpiece by determining whether a control instruction (for example, a pairing instruction) for the first wireless earpiece, generated by a user operating a human-computer interaction device such as a button or a touch screen on the charging case, is detected, which is not limited in the embodiment in any form.

In step 202, it is determined whether the first wireless earpiece is being charged; if so, step 203 is performed.

It is understandable that an object of this step may be to determine whether it is possible to send data to the first wireless earpiece by means of interchanging the two power supply pins corresponding to the first wireless earpiece by determining whether the charging case is charging the first wireless earpiece. In a case that the charging case is charging the first wireless earpiece, first to-be-sent data can be sent to the first wireless earpiece by means of interchanging the two power supply pins corresponding to the first wireless earpiece in the next step.

Correspondingly, in the case that the charging case is not charging the first wireless earpiece, that is, the charging of the first wireless earpiece is completed or the two power supply pins of the charging case are not connected to two charging pins of the first wireless earpiece, the method may be ended directly and no data will be sent to the first wireless earpiece. Alternatively, the first wireless earpiece may no longer be charged during communication if the first wireless earpiece is fully charged. For example, the power supply pins may be switched to corresponding communication wirings as in related art, which is not limited in the embodiment in any form.

In step 203, first to-be-sent data is obtained.

In step 204, a switch circuit is controlled to interchange power supply wirings for the power supply pins according to the first to-be-sent data, where the power supply wirings for the power supply pins include wirings corresponding to two output terminals of a charging output device in the charging case.

It is understandable that the two output terminals (e.g., 5V and GND in FIG. 5) of the charging output device of the charging case are respectively connected to the two power supply pins (e.g., A1 and B1 in FIG. 5) through the switch circuit (e.g., the analog switch in FIG. 5). An object of this step may be to achieve the interchange of the output voltages of the power supply pins by the processor controlling the switch circuit to interchange the power supply wirings for the power supply pins, that is, changing the output terminals of the charging output device that are connected to the power supply pins. In other words, in this step, the charging case can charge the first wireless earpiece in two ways. As shown in FIG. 5, in one way, A1 outputs 5V and B1 outputs GND, that is, the processor controls the analog switch (the switch circuit) to turn on a connection between A1 and the 5V output terminal, turn off a connection between A1 and the GND output terminal, turn on a connection between B1 and the GND output terminal and turn off a connection between B1 and the 5V output terminal; in the other way, A1 outputs GND and B1 outputs 5V, that is, the processor controls the analog switch (the switch circuit) to turn on the connection between A1 and the GND output terminal, turn off the connection between A1 and the 5V output terminal, turn on the connection between B1 and the 5V output terminal and turn off the connection between B1 and the GND output terminal.

It is further noted that, the embodiment takes for example the communication during the charging case charging one wireless earpiece (the first wireless earpiece), that is, communication during charging of the first wireless earpiece by controlling the switch circuit to interchange the output terminals of the charging output device that are connected to the power supply pins. The communication during the charging case charging another wireless earpiece (the second wireless earpiece), i.e., the communication during the charging case charging two wireless earpieces, can be configured by the designer. For example, the commination in a case that two power supply pins in the charging case corresponding to the second wireless earpiece are connected to two output terminals of another charging output device or to two other output terminals of the above charging output device may be implemented in a manner same as or similar to the method according to this embodiment, which is not limited in the embodiment in any form.

Specifically, if the two power supply pins in the charging case which are corresponding to the second wireless earpiece and the two power supply pins in the charging case which are corresponding to the first wireless earpiece are both connected to the two output terminals of the charging output device through the switch circuit, that is, as shown in FIG. 5, if the 5V output terminal and the GND output terminal are not only connected to A1 and B1 corresponding to the first wireless earpiece through the analog switch (the switch circuit), but also connected to A1 and B1 corresponding to the second wireless earpiece through the analog switch, the method in the embodiment may further include the step of controlling, in a case that communication with the second wireless earpiece is needed when the charging case is charging the second wireless earpiece through two other power supply pins, the switch circuit to interchange power supply wirings for the two other power supply pins corresponding to the second wireless earpiece according to obtained second to-be-sent data, where the power supply wirings for the two other power supply pins corresponding to the second wireless earpiece include wirings corresponding to the two output terminals of the charging output device.

Correspondingly, in order to ensure the safety of the charging case, if the two power supply pins in the charging case which are corresponding to the second wireless earpiece and the two power supply pins in the charging case which are corresponding to the first wireless earpiece are both connected to the two output terminals of the charging output device through the switch circuit, the method in the embodiment may further include the step of controlling the switch circuit to turn off connections between corresponding power supply pins and the output terminals of the charging output device, in a case that the first wireless earpiece or the second wireless earpiece does not need to be charged, to avoid outputting voltages to the two other power supply pins when only the first wireless earpiece is charged.

In the embodiment, the output voltages of the two power supply pins can be controlled to interchange with each other according to the first to-be-sent data by controlling the switch circuit to interchange the power supply wirings for the power supply pins. In this way, communication between the wireless earpiece and the charging case during charging is achieved with the two pins for charging, without the application of the power line communication method.

Figure 7:
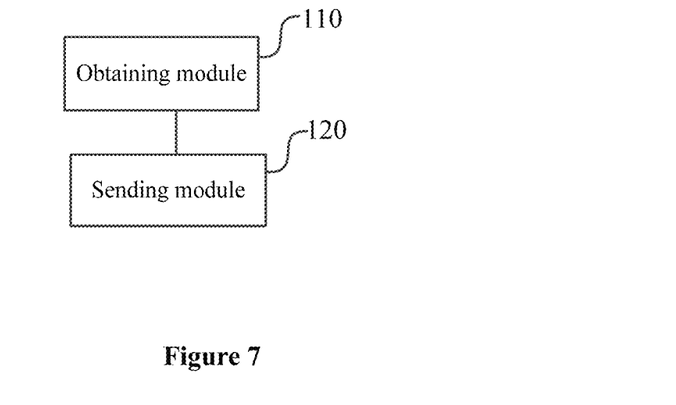
FIG. 7 is a schematic structural diagram of a communication control apparatus in a charging case according to an embodiment of the present disclosure.

Reference is made to FIG. 7, which is a schematic structural diagram of a communication control apparatus in a charging case according to an embodiment of the present disclosure. The apparatus may include an obtaining module 110 and a sending module 120.

The obtaining module 110 is configured to obtain first to-be-sent data, in a case that communication with a first wireless earpiece is needed when a charging case is charging the first wireless earpiece through two power supply pins.

The sending module 120 is configured to control output voltages of the two power supply pins to interchange with each other according to the first to-be-sent data, for the first wireless earpiece to obtain the first to-be-sent data during charging according to switching of the output voltage of a corresponding one of the power supply pins.

Optionally, the sending module 120 may be configured to control a switch circuit to interchange power supply wirings for the power supply pins according to the first to-be-sent data, where the power supply wirings for the power supply pins include wirings corresponding to two output terminals of a charging output device in the charging case.

Optionally, the apparatus may further include a second wireless earpiece sending module, configured to control, in a case that communication with a second wireless earpiece is needed when the charging case is charging the second wireless earpiece through two other power supply pins, the switch circuit to interchange power supply wirings for the two other power supply pins corresponding to the second wireless earpiece according to obtained second to-be-sent data, where the power supply wirings for the two other power supply pins corresponding to the second wireless earpiece include wirings corresponding to two output terminals of the charging output device.

In the embodiment, the output voltages of the two power supply pins can be controlled to be interchange with each other through the sending module 120 according to the first to-be-sent data, so that charging voltages of two charging pins in the first wireless earpiece can be interchanged with each other. Thus, when the wireless earpiece is charged under the interchangeable charging voltages of the two charging pins, the first to-be-sent data can be obtained according to the interchange of the charging voltages. Communication between the wireless earpiece and the charging case during charging is achieved with the two pins for charging without application of the power line communication method, which lowers the configuration cost and reduces the area occupied by the pins with considerations into both the miniaturization and aesthetic appearance.

Figure 8:
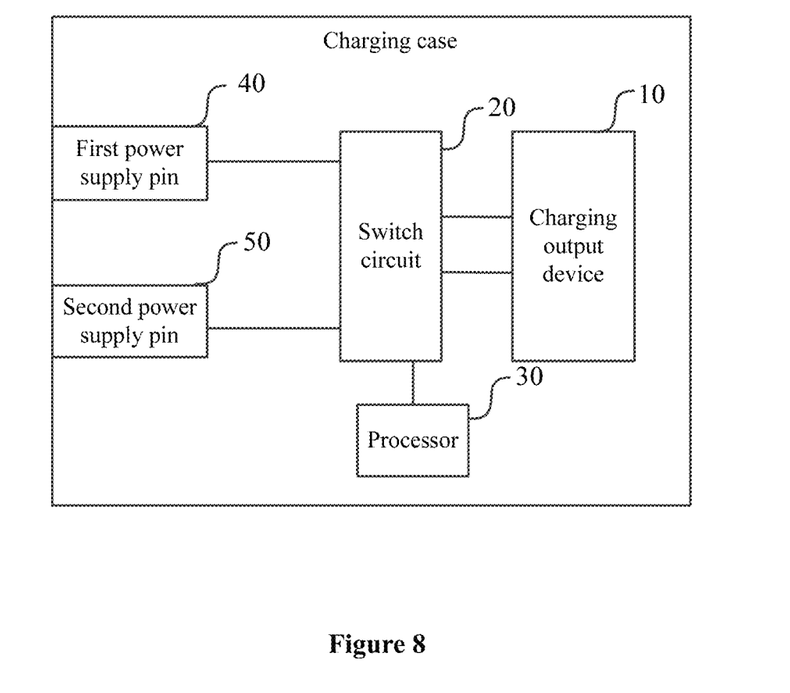
FIG. 8 is a schematic structural diagram of a charging case according to an embodiment of the present disclosure.

Reference is made to FIG. 8, which is a schematic structural diagram of a charging case according to an embodiment of the present disclosure. The charging case may include a charging output device 10, a switch circuit 20, a processor 30, a first power supply pin 40, and a second power supply pin 50.

A first output terminal and a second output terminal of the charging output device 10 are respectively connected to the first power supply pin 40 and the second power supply pin 50 through the switch circuit 20, and are configured to supply power to a first wireless earpiece connected to the first power supply pin 40 and the second power supply pin 50.

The switch circuit 20 is connected to the processor 30 and is configured to, under the control of the processor 30, turn on a connection between the first output terminal and the first power supply pin 40 and a connection between the second output terminal and the second power supply pin 50, or turn on a connection between the first output terminal and the second power supply pin 50 and a connection between the second output terminal and the first power supply pin 40.

It is understandable that in the embodiment, the processor 30 control the switch circuit to turn on the connection between the first output terminal and the first power supply pin 40 and the connection between the second output terminal and the second power supply pin 50, or turn on the connection between the first output terminal and the second power supply pin 50 and the connection between the second output terminal and the first power supply pin 40, so that the output voltages of the two power supply pins (the first power supply pin 40 and the second power supply pin 50) corresponding to the first wireless earpiece can be interchanged, that is, the processor 30 may perform the steps of the communication control method in the above embodiments by executing a corresponding computer program.

Specifically, specific structures and types of the charging output device 10, the first power supply pin 40 and the second power supply pin 50 in the embodiment can be configured by the designer, which, for example, can be implemented in the same or similar manner as the charging output device 10 and the power supply pins in the charging case of the related art and are not limited in this embodiment in any form.

It should be noted that in this embodiment, the switch circuit 20 that can be controlled by the processor 30 may be arranged between the two output terminals (the first output terminal and the second output terminal) of the charging output device 10 and the first power supply pin 40 and the second power supply pin 50, so as to control the interchange between power supply wirings for the first power supply pin 40 and the second power supply pin 50, that is, the switch circuit 20 can turn on or off the connection between the first power supply pin 40 or the second power supply pin 50 and each output terminal of the charging output device 10. In addition, a specific structure and a type of the switch circuit 20 can be configured by the designer, which may be the analog switch shown in FIG. 5 or a circuit including components such as a MOS transistor or a cross chip, as long as the switch circuit 20 can, under the control of the processor 30, turn on the connection between the first output terminal and the first power supply pin 40 and the connection between the second output terminal and the second power supply pin 50, or turn on the connection between the first output terminal and the second power supply pin 50 and the connection between the second output terminal and the first power supply pin 40, which is not limited in the embodiment in any form.

Optionally, the charging case may further include: a third power supply pin and a fourth power supply pin.

The first output terminal and the second output terminal of the charging output device 10 are respectively connected to the third power supply pin and the fourth power supply pin through the switch circuit 20, and are configured to supply power to a second wireless earpiece connected to the third power supply pin and the fourth power supply pin.

The switch circuit 20 is further configured to, under the control of the processor 30, turn on a connection between the first output terminal and the third power supply pin and a connection between the second output terminal and the fourth power supply pin, or turn on a connection between the first output terminal and the fourth power supply pin and a connection between the second output terminal and the third power supply pin. That is, the processor 30 may control the switch circuit 20, to communicate with the first wireless earpiece and/or the second wireless earpiece during charging of the first wireless earpiece and the second wireless earpiece both connected the first output terminal and the second output terminal of the charging output device 10.

Correspondingly, the switch circuit 20 may further be configured to, under the control of the processor 30, turn off the connections between the first power supply pin 40 and the second power supply pin 50 and the two output terminals (the first output terminal and the second output terminal) of the charging output device 10, and/or turn off the connections between the third power supply pin and the fourth power supply pin and the two output terminals (the first output terminal and the second output terminal) of the charging output device 10.

In the embodiment, the switch circuit 20, under the control of the processor 30, turns on the connection between the first output terminal and the first power supply pin 40 and the connection between the second output terminal and the second power supply pin 50, or turns on the connection between the first output terminal and the second power supply pin 50 and the connection between the second output terminal and the first power supply pin 40, so that charging voltages of two charging pins in the first wireless earpiece can be interchanged with each other. Thus, when the wireless earpiece is charged under the interchangeable charging voltages of the two charging pins, the first to-be-sent data can be obtained according to the interchange of the charging voltages. Communication between the wireless earpiece and the charging case during charging is achieved with the 2 pins for charging without application of the power line communication method, which lowers the configuration cost and reduces the area occupied by the pins with considerations into both the miniaturization and aesthetic appearance.

Figure 9:
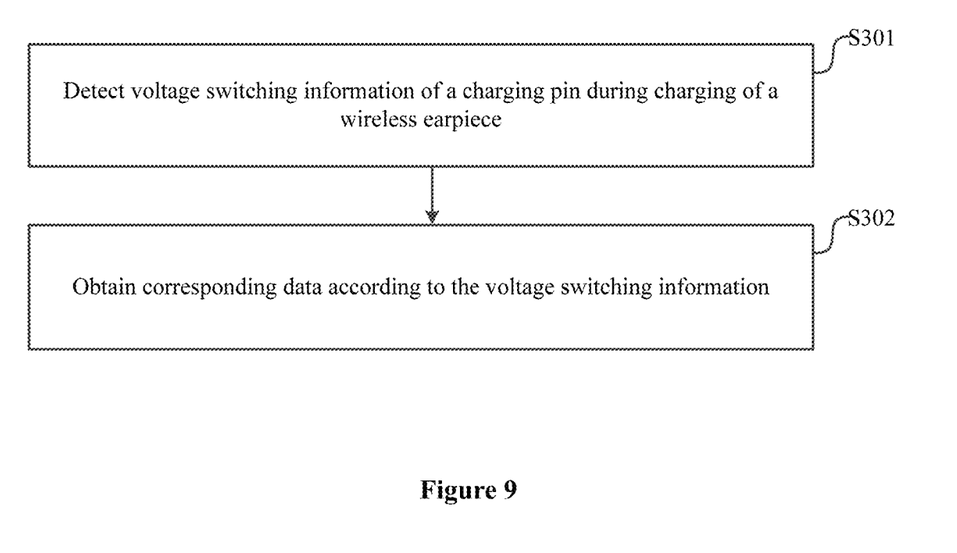
FIG. 9 is a flow chart of another communication control method according to an embodiment of the present disclosure.

Reference is made to FIG. 9, which is a flow chart of another communication control method according to an embodiment of the present disclosure. The method may include step 301 and step 302.

In step 301, voltage switching information of a charging pin is detected during charging of a wireless earpiece.

An object of this step may be to determine the voltage switching information by a communication device in the wireless piece detecting a charging voltage of a charging pin of the wireless earpiece, i.e., detecting an output voltage of a power supply pin in a charging case connected with the charging pin.

The charging pin in this step may be either or both of two charging pins in the wireless earpiece. The specific selection of the charging pin in this step can be configured by the designer, which is not limited in the embodiment in any form.

Correspondingly, the voltage switching information of the charging pin in this step may be information corresponding to charging voltage switching of the charging pin. As shown in FIG. 5, if the charging pin is A2 and the charging voltage of A2 is 5V, the voltage switching information may be 1, and if the charging voltage of A2 is GND, the voltage switching information may be 0.

In step 302, corresponding data is obtained according to the voltage switching information.

It is understandable that an object of this step may be to obtain corresponding data, for example, the first to-be-sent data from the charging case in the foregoing embodiments, by the communication device in the wireless earpiece according to the voltage switching information obtained through the detection.

Specifically, the specific manner for obtaining the corresponding data according to the voltage switching information in this step may be configured by the designer. For example, it can be implemented in the same or similar manner as in the related art, which is not limited in the embodiment in any form.

It should be noted that an object of this embodiment may be to obtain corresponding data by the wireless earpiece according to the interchange of the charging voltages of the two charging pins. Correspondingly, in order to ensure that charging of the wireless earpiece is not affected by the interchange of the charging voltages of the charging pins, the two charging pins may be connected to two input terminals of a charging device (e.g., a charging chip in the wireless earpiece in related art) through a voltage converter such as a full-bridge rectifier circuit, so as to use the voltage converter to convert the interchangeable charging voltages of the two charging pins into fixed output voltages to supply power to the charging device. As shown in FIG. 5, no matter how the charging voltages (5V and GND) of the two charging pins (A2 and B2) are interchanged, one of two output terminals of the full-bridge rectifier circuit always outputs 5V and the other always outputs GND.

In this embodiment, corresponding data is obtained according to the detected voltage switching information of the charging pin during charging of the wireless earpiece, so that the wireless earpiece can receive data sent by the charging device of the charging case through the charging pins during charging of the wireless earpiece. Communication between the wireless earpiece and the charging case during charging is achieved with the 2 pins for charging without application of the power line communication method, which lowers the configuration cost and reduces the area occupied by the pins with considerations into both the miniaturization and aesthetic appearance.

Figure 10:
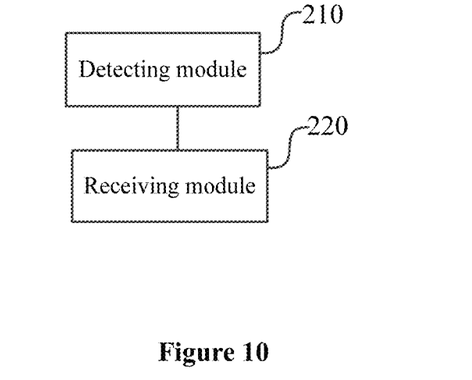
FIG. 10 is a schematic structural diagram of a communication control apparatus in a wireless earpiece according to an embodiment of the present disclosure.

Reference is made to FIG. 10, which is a schematic structural diagram of a communication control apparatus in a wireless earpiece according to an embodiment of the present disclosure. The apparatus may further include a detecting module 210 and a receiving module 220.

The detecting module 210 is configured to detect voltage switching information of a charging pin during charging of a wireless earpiece.

The receiving module 220 is configured to obtain corresponding data according to the voltage switching information.

In this embodiment, the receiving module 220 obtains the corresponding data according to the detected voltage switching information of the charging pin during charging of the wireless earpiece, so that the wireless earpiece can receive data sent by the charging device of the charging case through the charging pins during charging of the wireless earpiece. Communication between the wireless earpiece and the charging case during charging is achieved with the 2 pins for charging without application of the power line communication method, which lowers the configuration cost and reduces the area occupied by the pins with considerations into both the miniaturization and aesthetic appearance.

Figure 11:
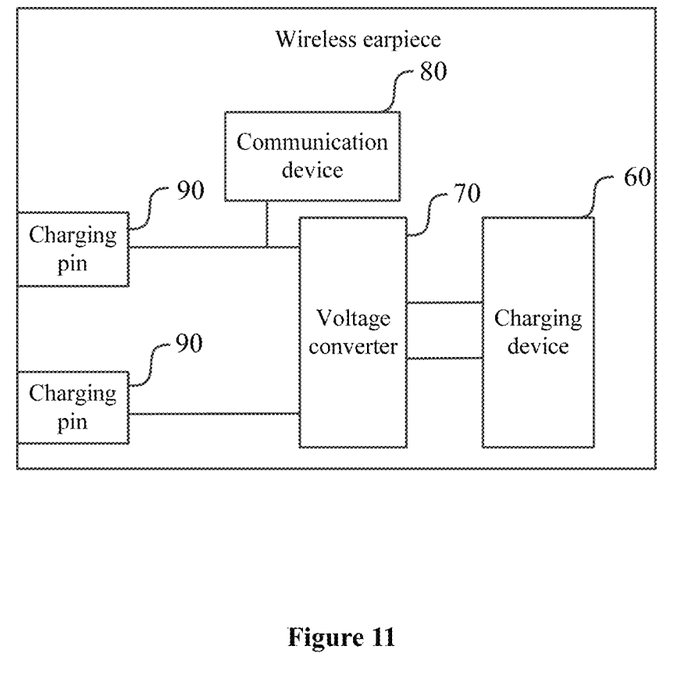
FIG. 11 is a schematic structural diagram of a wireless earpiece according to an embodiment of the present disclosure.

Reference is made to FIG. 11, which is a schematic structural diagram of a wireless earpiece according to an embodiment of the present disclosure. The charging case may include a charging device 60, a voltage converter 70, a communication device 80, and two charging pins 90.

Two input terminals of the voltage converter 70 are respectively connected to the two charging pins in a one-to-one manner. Two output terminals of the voltage converter 70 are connected to two power input terminals of the charging device 60, and are configured to convert interchangeable charging voltages of the two charging pins into fixed output voltages for supplying power to the charging device.

The communication device 80 is configured to detect voltage switching information of the corresponding charging pin 90, and obtain corresponding data according to the voltage switching information.

It is understandable that the voltage converter 70 in this embodiment is a device for converting interchangeable input voltages of the two input terminals into fixed output voltages outputted by the two output terminals. For example, in a case that an input voltage of a first input terminal is 5V and an input voltage of a second input terminal is GND, an output voltage of a first output terminal of the two output terminals is 5V, and an output voltage of a second output terminal is GND; in a case that the input voltage of the first input terminal is changed to GND and the input voltage of the second input terminal is changed to 5V, the output voltage of the first output terminal is still 5V, and the output voltage of the second output terminal is still GND. Specifically, a specific structure and a type of the voltage converter 70 in this embodiment can be configured by the designer, which, for example, may be a full-bridge rectifier circuit in related art, and is not limited in the embodiment in any form as long as it can implement the above-described function.

The charging device 70 in this embodiment may be a device that charges the wireless earpiece with power supply of the voltage converter 70, which, for example, may be the charging chip in FIG. 3.

Specifically, a specific connection between the communication device 80 and the two charging pins 90 in this embodiment can be configured by the designer. For example, the communication device 80 may be connected to one charging pin 90, or connected to two charging pins 90, which is not limited in the embodiment in any form as long as it is ensured that the communication device 80 can detect the voltage switching information of the corresponding charging pin 90.

In this embodiment, the communication device 80 obtains the corresponding data according to the detected voltage switching information of the charging pin during charging of the wireless earpiece, and the voltage converter 70 protects the charging of the wireless earpiece from influence of the interchange of the charging voltages of the two charging pins 90, so that the wireless earpiece can receive data sent by the charging device in the charging case through the charging pins during charging. Communication between the wireless earpiece and the charging case during charging is achieved with the two pins for charging without application of the power line communication method, which lowers the configuration cost and reduces the area occupied by the pins with considerations into both the miniaturization and aesthetic appearance.

In addition, a communication control system is further provided according to an embodiment of the present disclosure. The system includes the charging case according to the foregoing embodiments and the wireless earpiece according to the foregoing embodiments.

The embodiments in the specification are described in a progressive manner. Each embodiment focuses on the differences from other embodiments, and the same or similar parts between the embodiments can be referred to each other. For the device, system, charging case, and wireless earpiece disclosed in the embodiments, since they correspond to the methods disclosed in the embodiments, the description is relatively simple, and reference can be made to the description of the method for related parts thereof.

Those skilled in the art can further realize that the units and algorithm steps of the examples described in the embodiments disclosed herein can be implemented by electronic hardware, computer software, or a combination of both. In order to clearly illustrate the interchangeability of hardware and software, the composition and steps of each example have been described generally in terms of function in the above description. Whether these functions are executed by hardware or software depends on the specific application and design constraints of the technical solution. Those skilled in the art can use different methods for each specific application to implement the described functions, but such implementation should not be considered as going beyond the scope of the present disclosure.

The steps of the method or algorithm described in the embodiments disclosed herein can be directly implemented by hardware, a software module executed by a processor, or a combination of both. The software module can be placed in a random access memory (RAM), internal memory, read-only memory (ROM), electrically programmable ROM, electrically erasable programmable ROM, register, hard disk, removable disk, CD-ROM, or in any other form of storage medium known in the technical field.

The above describes in detail a method, apparatus, and system for communication control, a charging case and a wireless earpiece according to the present disclosure. Specific examples are used herein to illustrate the principle and implementation of the present disclosure. The description of the above examples is only used to help understand the method and core idea of the present disclosure. It should be pointed out that for those of ordinary skill in the art, without departing from the principle of the present disclosure, numerous improvements and modifications can be made to the present disclosure, and these improvements and modifications also fall within the protection scope of the claims of the present disclosure.

The invention claimed is:

1. A communication control method, comprising:
    obtaining first to-be-sent data, in a case that communication with a first wireless earpiece is needed when a charging case is charging the first wireless earpiece through two power supply pins, and
    controlling output voltages of the two power supply pins to interchange with each other according to the first to-be-sent data, whereby the first wireless earpiece obtains the first to-be-sent data during charging according to switching of the output voltage of a corresponding one of the power supply pins.

2. The communication control method according to claim 1, wherein controlling the output voltages of the two power supply pins to interchange with each other according to the first to-be-sent data comprises:
    controlling a switch circuit to interchange power supply wirings for the power supply pins according to the first to-be-sent data, wherein the power supply wirings for the power supply pins comprise wirings corresponding to two output terminals of a charging output device in the charging case.

3. The communication control method according to claim 2, further comprising:
    controlling, in a case that communication with a second wireless earpiece is needed when the charging case is charging the second wireless earpiece through two other power supply pins, the switch circuit to interchange power supply wirings for the two other power supply pins corresponding to the second wireless earpiece according to obtained second to-be-sent data, wherein the power supply wirings for the two other power supply pins corresponding to the second wireless earpiece comprise wirings corresponding to the two output terminals of the charging output device.

4. A charging case, comprising a charging output device, a switch circuit, a processor, a first power supply pin, and a second power supply pin, wherein a first output terminal and a second output terminal of the charging output device are respectively connected to the first power supply pin and the second power supply pin through the switch circuit, and are configured to supply power to a first wireless earpiece connected to the first power supply pin and the second power supply pin, and the switch circuit is connected to the processor and is configured to, under the control of the processor, turn on a connection between the first output terminal and the first power supply pin and a connection between the second output terminal and the second power supply pin, or turn on a connection between the first output terminal and the second power supply pin and a connection between the second output terminal and the first power supply pin.

5. The charging case according to claim 4, further comprising a third power supply pin, and a fourth power supply pin, wherein the first output terminal and the second output terminal of the charging output device are respectively connected to the third power supply pin and the fourth power supply pin through the switch circuit, and are configured to supply power to a second wireless earpiece connected to the third power supply pin and the fourth power supply pin, and the switch circuit is further configured to, under the control of the processor, turn on a connection between the first output terminal and the third power supply pin and a connection between the second output terminal and the fourth power supply pin, or turn on a connection between the first output terminal and the fourth power supply pin and a connection between the second output terminal and the third power supply pin.

6. A wireless earpiece, comprising a charging device, a voltage converter, a communication device, and two charging pins, where two input terminals of the voltage converter are respectively connected to the two charging pins in a one-to-one manner, two output terminals of the voltage converter are connected to two power input terminals of the charging device, and are configured to convert interchangeable charging voltages of the two charging pins into fixed output voltages for supplying power to the charging device, and the communication device is configured to detect voltage switching information of a corresponding one of the charging pins, and obtain corresponding data according to the voltage switching information.

* * * * *